(12) United States Patent
Gonzalez-Salvador (10) Patent No.: US 7,987,937 B2
(45) Date of Patent: Aug. 2, 2011

(54) SYSTEMS AND METHODS FOR ASSEMBLING A FRONT END MODULE TO A VEHICLE

(75) Inventor: Bernardo Gonzalez-Salvador, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 649 days.

(21) Appl. No.: 11/761,645

(22) Filed: Jun. 12, 2007

(65) Prior Publication Data
US 2008/0308332 A1 Dec. 18, 2008

(51) Int. Cl.
*B60K 11/04* (2006.01)
(52) U.S. Cl. .................... 180/68.4; 296/193.04
(58) Field of Classification Search ............ 180/68.4, 180/68.1; 296/194, 203.02; 293/102, 120
See application file for complete search history.

(56) References Cited

U.S. PATENT DOCUMENTS

| | | | | |
|---|---|---|---|---|
| 5,226,695 A | * | 7/1993 | Flint et al. | 296/191 |
| 5,271,473 A | * | 12/1993 | Ikeda et al. | 180/68.4 |
| 6,634,702 B1 | * | 10/2003 | Pleschke et al. | 296/187.04 |
| 6,758,515 B2 | * | 7/2004 | Ozawa et al. | 296/187.09 |
| 6,854,792 B2 | * | 2/2005 | Tsukahara | 296/203.02 |
| 6,948,769 B2 | * | 9/2005 | Borkowski et al. | 296/203.02 |
| 7,338,191 B2 | * | 3/2008 | Konno et al. | 362/507 |
| 7,410,209 B2 | * | 8/2008 | Clapie | 296/193.09 |
| 2003/0160477 A1 | * | 8/2003 | Sasano et al. | 296/203.02 |

FOREIGN PATENT DOCUMENTS
EP 1048554 A2 * 11/2000
JP 07304462 * 11/1995

* cited by examiner

*Primary Examiner* — Paul N Dickson
*Assistant Examiner* — Bridget Avery
(74) *Attorney, Agent, or Firm* — Ralph E. Smith (57) ABSTRACT

The present disclosure provides a Front End Module (FEM) assembly and associated assembly method with a rail system to enable efficient assembly, tighter clearances between the front end module assembly and the vehicle, and time and cost savings. The present disclosure provides a FEM assembly including grilles and headlamps and a rail system enabling the FEM to be assembled on a vehicle. Advantageously, the present disclosure allows the FEM to pass between fenders on the vehicle with a very tight clearance condition. The rail system included in the present disclosure allows the FEM to be assembled efficiently while protecting grilles and headlamps from being damaged by fenders and protecting the fenders from damage from the FEM.

11 Claims, 12 Drawing Sheets

SYSTEMS AND METHODS FOR ASSEMBLING A FRONT END MODULE TO A VEHICLE

FIELD OF THE DISCLOSURE

The present disclosure relates generally to vehicle assembly. More specifically, the present disclosure relates to a front end module assembly and an associated assembly method which includes a rail system to guide the front end module assembly onto a frame of the vehicle enabling efficient assembly, tighter clearances between the front end module assembly and the vehicle, and protection of the front end module assembly and the vehicle front damage during assembly.

BACKGROUND OF THE DISCLOSURE

Vehicles include a front end module (FEM) assembly with a front fascia to provide openings for cooling air. Additionally, the FEM can include a vehicle-specific grille texture, headlamp housing, means to connect to the vehicle frame and bumper, and the like. Advantageously, FEM assemblies benefit vehicle assemblers through a modular assembly approach allowing component integration, time and cost savings, and the like. Despite the advantages of the modular FEM assembly, assembling existing FEM assemblies is time-consuming and complex. Existing FEM assemblies and assembly methods include complicated lift and positioning plant assist devices. Further, plant operators require specific skill and care to assemble such existing FEM assemblies. Finally, existing FEM assemblies are prone to damaging vehicle fenders and FEM grilles costing considerable repair time and cost during assembly followed by increased warranty costs on possible corrosion in the fenders due to damage from assembly. Accordingly, current FEM assemblies do not allow tight gaps to exist between the FEM and fenders with frontal projections without damaging both parts during regular production processes.

BRIEF SUMMARY OF THE DISCLOSURE

In various exemplary embodiments, the present disclosure provides a FEM assembly and associated assembly method with a rail system to guide the front end module assembly onto a frame of the vehicle enabling efficient assembly, tighter clearances between the FEM assembly and the vehicle, and protection of the FEM assembly and the vehicle from damage during assembly. The present disclosure provides a FEM assembly including grilles and headlamps and a rail system enabling the FEM assembly to be assembled on a vehicle. Advantageously, the present disclosure allows the FEM assembly to pass between fenders on the vehicle with a very tight clearance condition. The rail system included in the present disclosure allows the FEM assembly to be assembled efficiently while protecting grilles and headlamps from being damaged by fenders and protecting the fenders from damage from the FEM assembly. The rail system substantially constrains movement of the FEM assembly when being placed onto the vehicle during assembly avoiding contact with any portion of the fenders in a dynamic condition. The rail system includes a guide on the fenders, such as a fender reinforcement bracket tab, and a rail connected to the FEM assembly. Once the FEM is in the final installation position, the rail can be disengaged from the fender, allowing final assembly by rotating the FEM rearward.

In an exemplary embodiment of the present disclosure, a front end module assembly for a vehicle includes a front end module carrier and a rail disposed on the front end module carrier, wherein the rail is configured to engage a tab disposed on a fender of the vehicle, and the rail is configured to substantially constrain movement of the front end module assembly while the front end module assembly is positioned on a frame on the vehicle. The front end module assembly further includes any of a grille, a headlamp housing, a coolant module, and combinations thereof. The fender includes a fender reinforcement bracket, and the tab is disposed on the fender reinforcement bracket. The substantially constrained movement of the front end assembly while the front end module assembly is positioned allows the front end module assembly to pass between fenders on the vehicle with a tight clearance condition. The carrier rail and the tab are configured to guide the front end module assembly onto the vehicle for assembly avoiding front end module assembly contact with any portion of the fender. The substantially constrained movement of the front end assembly while the front end module assembly is positioned protects the grille and headlamp housing from being damaged by the fender, and protects the fender from being damaged by the front end module assembly. The carrier rail is one of integrally formed with the front end module carrier and mountably attached to the front end module carrier.

In another exemplary embodiment of the present invention, a method of assembling a front end module assembly onto a vehicle frame includes providing a front end module assembly, wherein the front end module assembly includes a rail disposed on a front end module carrier; positioning the front end module assembly substantially over a vehicle frame; engaging the rail with a tab disposed on the vehicle frame; and guiding the front end module assembly into a final assembly position on the vehicle frame, wherein the rail and the tab are configured to substantially constrain movement of the front end module assembly during the guiding step. The method of assembling a front end module assembly of further includes disengaging the rail from the tab and attaching the front end module assembly to the vehicle frame. The front end module assembly further includes any of a grille, a headlamp housing, a coolant module, and combinations thereof. The vehicle frame includes a fender, and the fender includes a fender reinforcement bracket, and wherein the tab is disposed on the fender reinforcement bracket. The substantially constrained movement of the front end assembly of the guiding step allows the front end module assembly to pass between fenders on the vehicle with a tight clearance condition. The rail and the tab are configured to guide the front end module assembly onto the vehicle frame avoiding front end module assembly contact with any portion of a fender attached to the vehicle frame. The substantially constrained movement of the front end assembly of the guiding step protects the grille and headlamp housing from being damaged by a fender attached to the vehicle frame and protects the fender from being damaged by the front end module assembly. The rail is integrally formed with the front end module carrier and mountably attached to the front end module carrier.

BRIEF DESCRIPTION OF THE DRAWINGS

The present disclosure is illustrated and described herein with reference to the various drawings, in which like reference numbers denote like system components, respectively, and in which.

DETAILED DESCRIPTION OF THE DISCLOSURE

In various exemplary embodiments, the present disclosure provides a FEM assembly and associated assembly method with a rail system to guide the front end module assembly onto a frame of a vehicle enabling efficient assembly, tighter clearances between the FEM assembly and the vehicle, and protection of the FEM assembly and the vehicle from damage during assembly. The present disclosure provides a FEM assembly including grilles and headlamps and a rail system enabling the FEM assembly to be assembled on a vehicle. Advantageously, the present disclosure allows the FEM assembly to pass between fenders on the vehicle with a very tight clearance condition. The rail system including in the present disclosure allows the FEM assembly to be assembled efficiently while protecting grilles and headlamps from being damaged by fenders, and protecting the fenders from damage from the FEM assembly. The rail system substantially constrains movement of the FEM assembly when being placed onto the vehicle during assembly avoiding contact with any portion of the fenders in a dynamic condition. The rail system includes a guide on the fenders, such as a fender reinforcement bracket tab, and a rail connected to the FEM assembly. Once the FEM is in the final installation position, the rail can be disengaged from the fender, allowing final assembly by rotating the FEM rearward.

Figure 1:
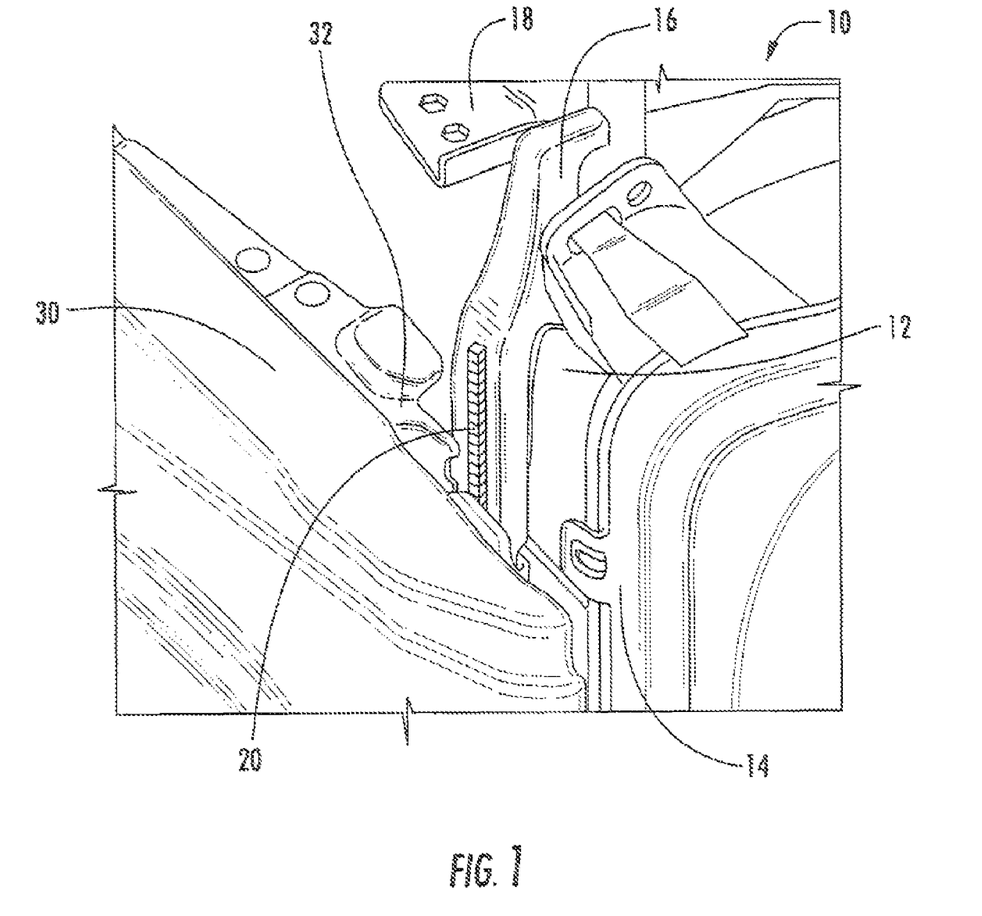
FIG. 1 is a side perspective view of a FEM assembly for a vehicle including a headlamp housing, a grille, a FEM carrier, and a FEM upper cross member according to an exemplary embodiment of the present disclosure.

Referring to FIG. 1, a side perspective view illustrates a FEM assembly 10 for a vehicle including a headlamp housing 12, a grille 14, a FEM carrier 16, and a FEM upper cross member 18 according to an exemplary embodiment of the present disclosure. The headlamp housing 12 contains headlamps for the vehicle. The grille 14 is an opening located on the front of the FEM assembly 10 of the vehicle. The grille 14 allows air to flow over the radiator and cool the engine compartment of the vehicle. Additionally, the grille 14 provides a distinctive styling element typically used for vehicle brand identification. The headlamp housing 12 and grille 14 attach to the FEM carrier 16 which provides the support for the various components integrated within the FEM assembly 10. The FEM upper cross member 18 attaches to the FEM carrier 16. Optionally, a coolant module attaches to the FEM cross member 18. Advantageously, the FEM assembly 10 provides a modular assembly approach allowing component integration, cost savings, and the like. This modular assembly approach streamlines the vehicle assembly process.

In an exemplary embodiment, the FEM carrier 16 is a frame including attachment means to support the headlamp housing 12, the grille 14, and the FEM upper cross member 18. The FEM carrier 16 also includes attachment means to connect to a vehicle frame once the FEM assembly 10 is positioned in an engaged position. The headlamp housing 12 is attached to the FEM carrier 16, and includes electrical connections for a headlamp. The grille 14 attaches to the FEM carrier 16 covering the headlamp housing 12. The grille 14 includes an opening for the headlamp and openings to allow air to flow through the FEM assembly 10. The FEM upper cross member 18 is attached to an upper portion of the FEM carrier 16, and is a bar extending substantially across the FEM assembly 10. Optionally, the FEM upper cross member 18 can support a coolant module.

The vehicle includes a fender 30 and a fender reinforcement bracket 32. The fender 30 is the part of the vehicle that frames a wheel well. The fender reinforcement bracket 32 is attached to the fender 30. The FEM assembly 10 is configured to attach to the vehicle, such as at the fender reinforcement bracket 32. In an exemplary embodiment of the present disclosure, the FEM assembly 10 includes a carrier rail 20 on the FEM carrier 16. The carrier rail 20 enables the FEM assembly 10 to be assembled on the vehicle efficiently and farther protects both the FEM assembly 10 and the fender 30 on the vehicle from damage during the assembly process.

The carrier rail 20 slides into the reinforcement bracket 32 located on the fender 30, such as through a tab or groove included on the reinforcement bracket 32 or the like. Once the carrier rail 20 is engaged in the reinforcement bracket 32, the carrier rail 20 guides the FEM assembly 10 into position allowing the FEM assembly 10 to pass between the fender 30 on the vehicle with a very tight clearance condition. The carrier rail 20 guides the FEM assembly 10 onto the vehicle for assembly avoiding contact with any portion of the fenders 30. Effectively, the carrier rail 20 and the fender reinforcement bracket are configured to substantially constrain the movement of the FEM assembly 10 along a vertical axis with respect to the vehicle frame. In one embodiment, the carrier rail 20 is attached to a tab in the fender reinforcement bracket 32, and once the FEM assembly 10 is in the final installation position, the carrier rail 20 can be disengaged from the tab, allowing final assembly by rotating the FEM assembly 10 rearward.

Figure 2:
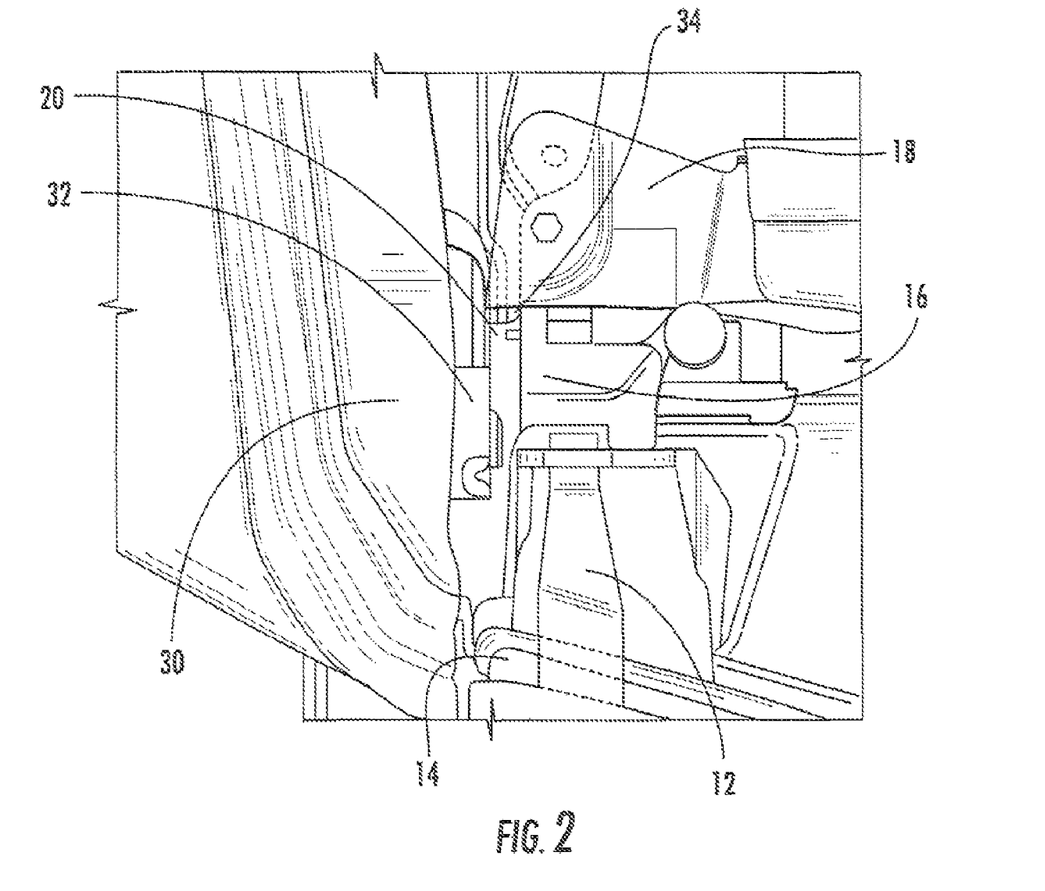
FIG. 2 is a top perspective view of the FEM assembly for the vehicle in an engaged position according to an exemplary embodiment of the present disclosure.

Referring to FIG. 2, a top perspective view illustrates the FEM assembly 10 for the vehicle in an engaged position according to an exemplary embodiment of the present disclosure. The FEM assembly 10 includes the carrier rail 20 on both sides of the FEM carrier 16. Additionally, the vehicle includes the fender 30 on both sides with the fender reinforcement bracket 32. The fender reinforcement bracket 32 includes a tab 34 configured to receive the carrier rail 20. The tab 34 is sized according to the carrier rail 20 and is operable to constrain the movement of the FEM assembly 10 when it is placed onto the vehicle. In an exemplary embodiment, the tab 34 includes a groove adapted to receive the carrier rail 20, and to allow the carrier rail 20 to slide vertically. As described herein, the carrier rail 20 disengages from the tab 34 on the fender reinforcement bracket 32, and the FEM assembly 10 is placed into the final, assembly position. The carrier rail 20 remains attached to the FEM assembly 10, but is not engaged with the tab 34 or the fender reinforcement bracket 32 once in the final assembly position. Additionally, the FEM upper cross member 18 can attach to a frame on the vehicle.

Figure 3:
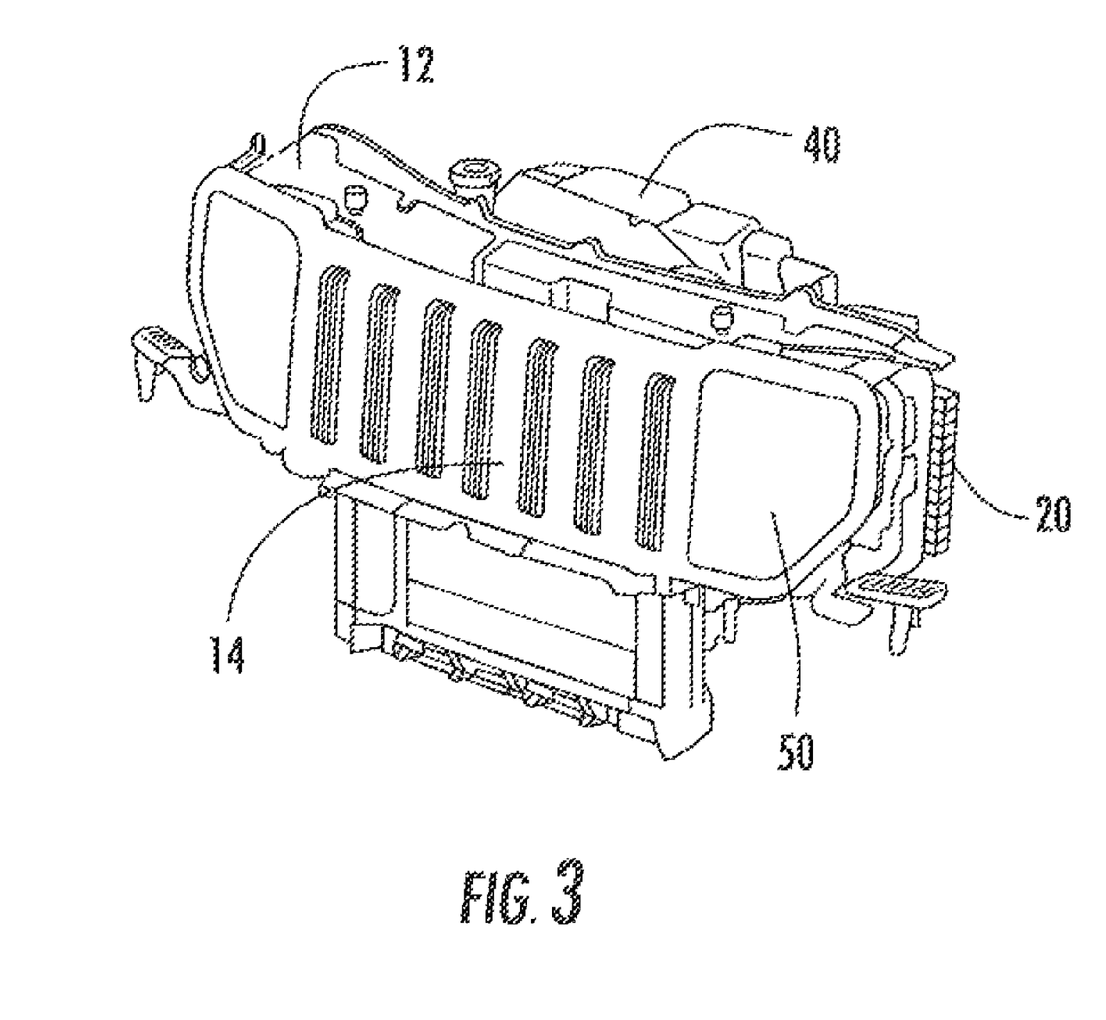
FIG. 3 is a perspective view of an exemplary embodiment of the FEM assembly.

Referring to FIG. 3, a side perspective view illustrates an exemplary embodiment of the FEM assembly 10. As described herein, the FEM assembly 10 includes the headlamp housing 12 which includes a headlamp 50. A coolant module 40 can be attached to the FEM carrier 18. The coolant module 40 can be a cooling system for the engine, transmission, power steering, and the like. In this exemplary embodiment, the FEM assembly 10 includes the grille 14 of a Jeep® (available from DaimlerChrysler of Auburn Hills, Mich.). As described herein, the exemplary embodiment of the FEM assembly 10 in FIG. 3 includes the carrier rail 20 on both sides of the FEM assembly 10. Also, the carrier rail 20 is attached to the FEM carrier 16. The present disclosure allows vehicle assemblers to streamline assembly through module integration. For example, a FEM carrier 16 with the carrier rail 20 can be utilized in multiple different vehicles. Advantageously, the FEM assembly 10 allows a single FEM to be used across different vehicles. For example, the grille 14 can be changed for each different vehicle; different coolants 40 can be added depending on the vehicle, different headlamp housings 12 can be utilized, and the like.

Figure 4:
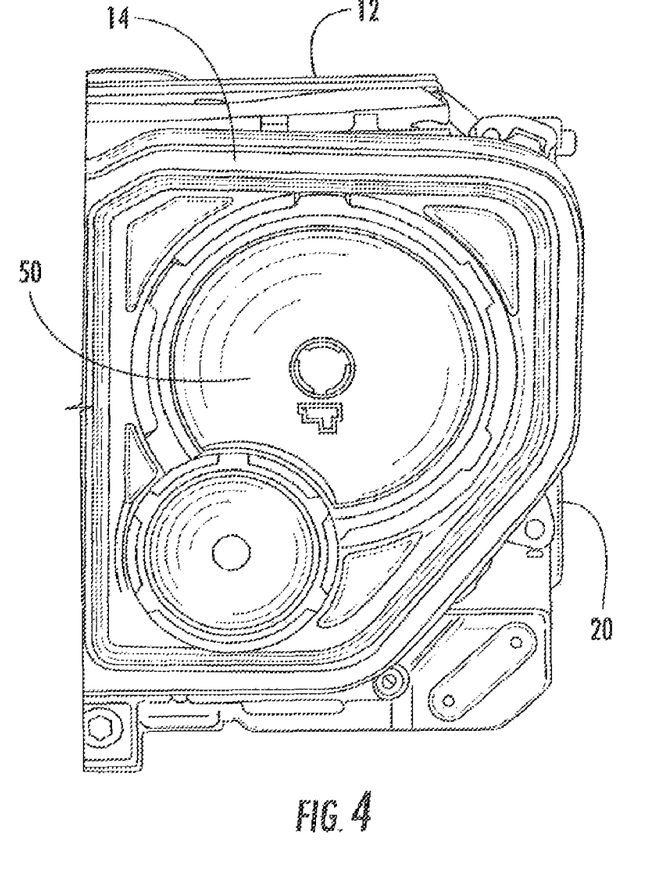
FIG. 4 is a front perspective view of an exemplary embodiment of the FEM assembly.
Figure 5:
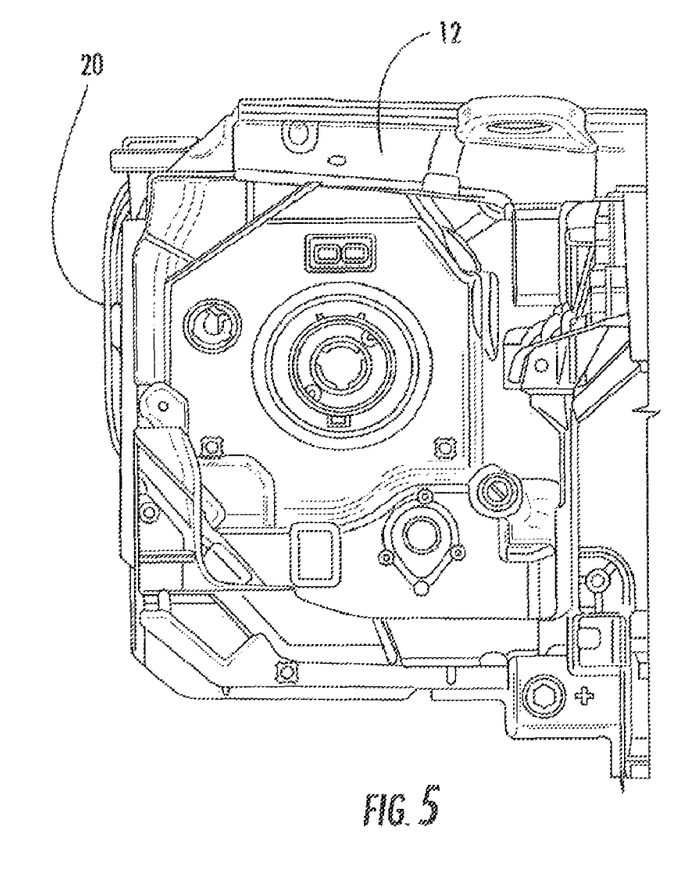
FIG. 5 is a rear perspective view of an exemplary embodiment of the FEM assembly.

Referring to FIGS. 4 and 5, front and rear perspective views illustrate an exemplary embodiment of the FEM assembly 10. FIG. 4 illustrates a front view of the FEM assembly 10 showing the headlamp housing 12 with the headlamp 50 and the grille 14. FIG. 5 illustrates a rear view of the FEM assembly 10 showing the rear housing of the headlamp housing 12. Both FIGS. 4 and 5 illustrate the carrier rail 20 located on the side of the FEM assembly 10. Additionally, the vehicle includes the fender reinforcement bracket 32 with the tab 34 on both sides to engage the FEM assembly 10 with the carrier rail 20 on both sides.

Figure 6:
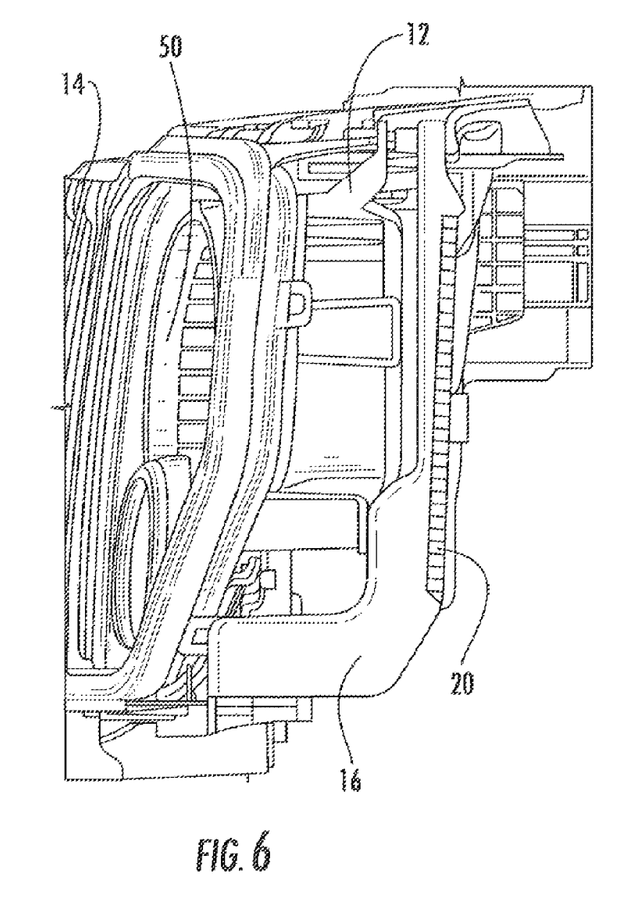
FIG. 6 is a side perspective view of an exemplary embodiment of the FEM assembly.
Figure 7:
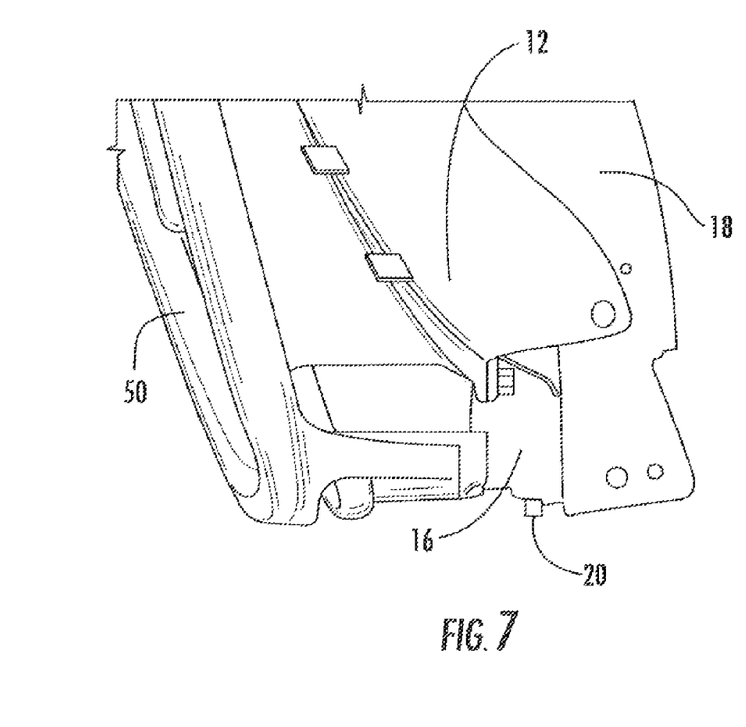
FIG. 7 is a top perspective view of an exemplary embodiment of the FEM assembly.

Referring to FIGS. 6 and 7, side and top perspective views illustrate an exemplary embodiment of the FEM assembly 10. FIG. 6 illustrates a side view of the FEM assembly 10 showing the carrier rail 20 attached to the FEM carrier 16, the headlamp housing 12 with the headlamp 50 attached to the FEM carrier 16, and the grille 14 over the headlamp housing 12 attached to the FEM earner 16. FIG. 7 illustrates a top view of the FEM assembly 10 showing the headlamp housing 12 attached to the FEM carrier 16, the FEM upper cross member 18 attached to the FEM carrier 16, and the headlamp 50 in the headlamp housing 12. Both FIGS. 6 and 7 illustrate the carrier rail 20 located on the side of the FEM assembly 10.

Figure 8:
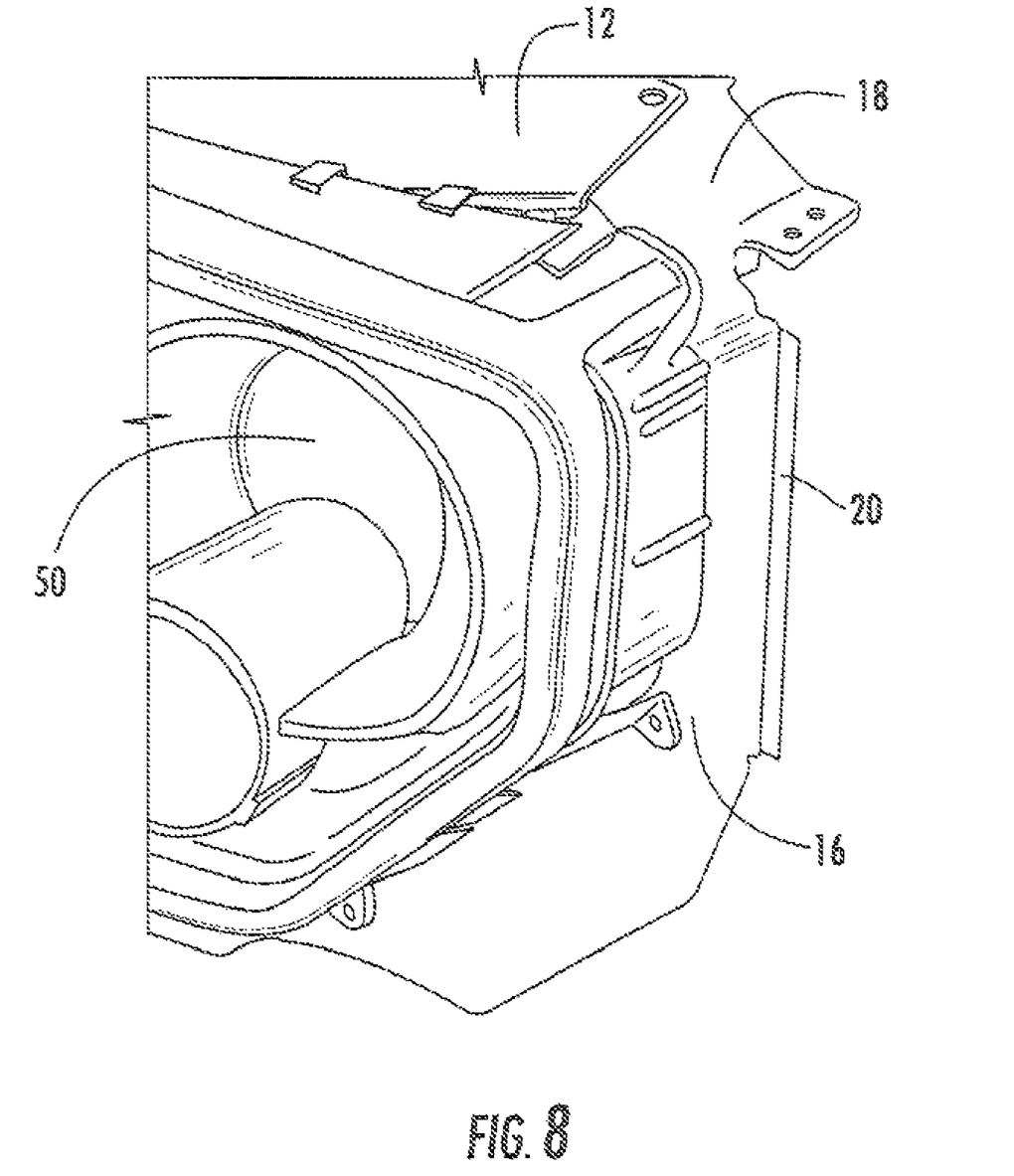
FIG. 8 is another side perspective view of an exemplary embodiment of the FEM assembly.

Referring to FIG. 8, a side perspective view illustrates an exemplary embodiment of the FEM assembly 10. As described herein, the headlamp housing 12 includes the headlamp 50. The headlamp housing 12 is mountably attached to the FEM carrier 16. Advantageously, this allows different headlamp housings 12 to be utilized on the same FEM carrier 16 for different vehicle types. The FEM carrier 16 includes the carrier rail 20 on the side and the FEM upper cross member 18 on the top. The carrier rail 20 can be integrally formed, within the FEM carrier 16, such as during a casting process. Additionally, the carrier rail 20 can be mountably attached to the FEM carrier 16. The FEM upper cross member 18 is attached to the FEM carrier 16.

Figure 9:
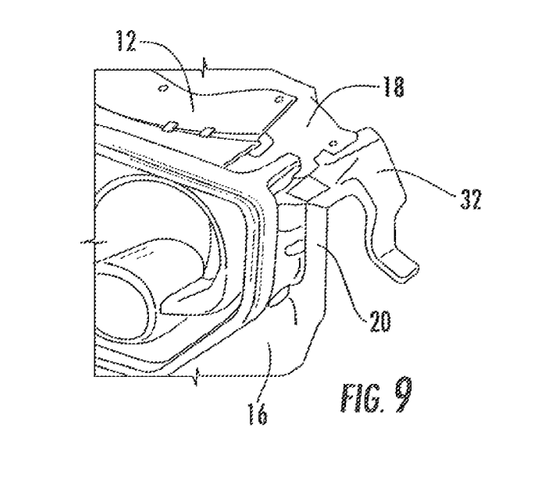
FIG. 9 is a side perspective view of an exemplary embodiment of the FEM assembly in an installed position.
Figure 10:
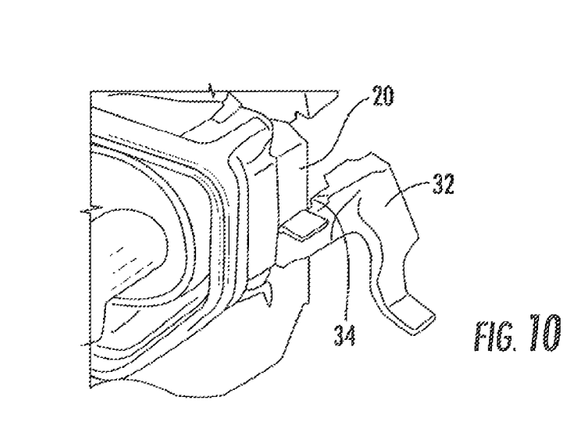
FIG. 10 is a side perspective view of an exemplary embodiment of the FEM assembly in process of sliding into the installed position of FIG. 9.

Referring to FIGS. 9 and 10, side perspective views illustrate an exemplary embodiment of the FEM assembly 10 in an installed position and in process of sliding into the installed position. FIG. 9 illustrates the FEM assembly 10 with the headlamp housing 12 and the FEM upper cross member 18 attached to the FEM carrier 16 in the final installed position. Here, the carrier rail 20 attached to the FEM carrier 16 is disengaged from the tab 34 in the fender reinforcement bracket 32 on the fender 30. FIG. 10 illustrates the FEM assembly 10 with the carrier rail 20 sliding into the tab 34 located on the fender reinforcement bracket 32. As described herein, the carrier rail 20 guides the FEM assembly onto the vehicle for assembly through the tab 34 avoiding contact with any portion of the fenders in a dynamic condition.

Figure 11:
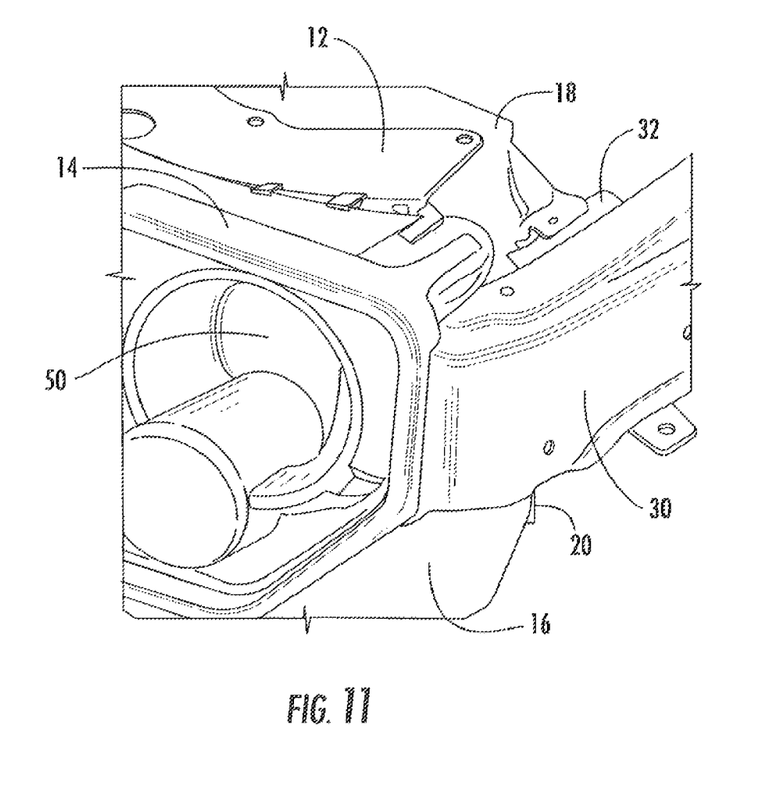
FIG. 11 a side perspective view of an exemplary embodiment of the FEM assembly in a final assembly position with the fender.

Referring to FIG. 11, a side perspective view illustrates an exemplary embodiment of the FEM assembly 10 in a final assembly position with the fender 30. Advantageously, the FEM assembly 10 is configured to pass between fenders 30 on the vehicle with a very tight clearance condition. The carrier rail 20 allows the FEM assembly 10 to be assembled efficiently while protecting grilles 14 and headlamps 50 from being damaged by fenders 30 and protecting the fenders 30 from damage from the FEM assembly 10. In FIG. 11, the FEM assembly 10 includes the FEM carrier 16 with the headlamp housing 12 with the headlamp 50, the grille 14, and the FEM upper cross member 18 each attached to the FEM carrier 16. In this embodiment, the FEM upper cross member 18 attaches to the fender reinforcement bracket 32, such as with a bolt or the like. The carrier rail 20 is mountably attached or integrally formed in the FEM carrier 16. FIG. 9 illustrates the final assembly position with the carrier rail 20 disengaged from the fender reinforcement bracket 32.

Figure 12:
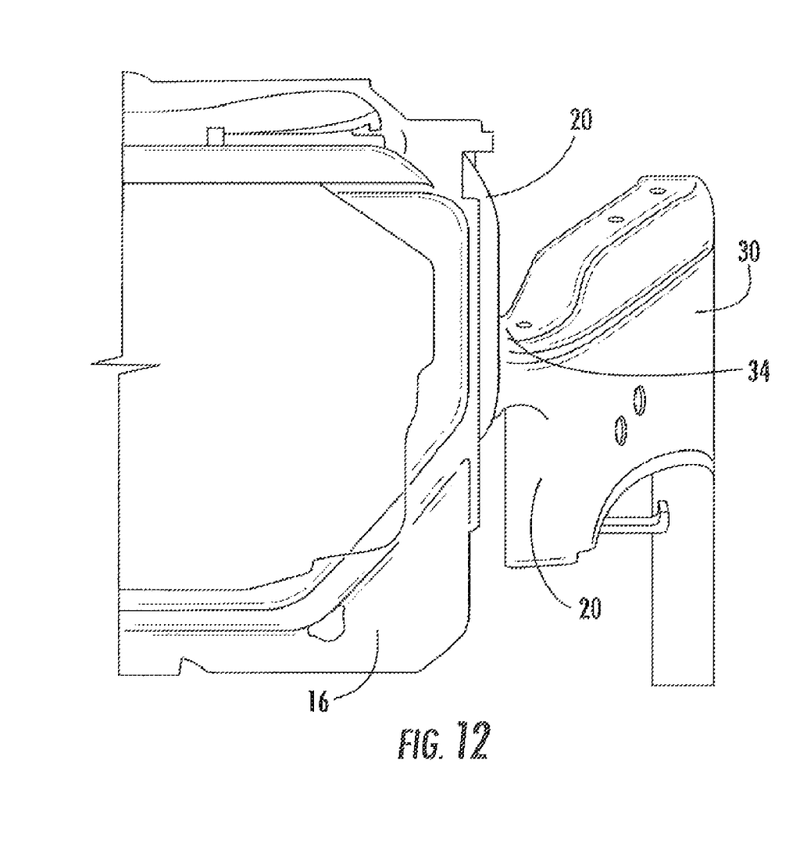
FIG. 12 is a perspective view of an exemplary embodiment of the FEM assembly sliding into a tab in the fender reinforcement bracket.
Figure 13:
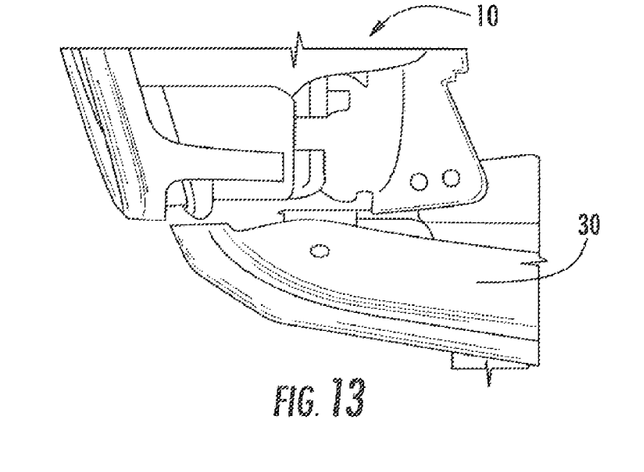
FIG. 13 is a top perspective view of the FEM assembly sliding in position.
Figure 14:
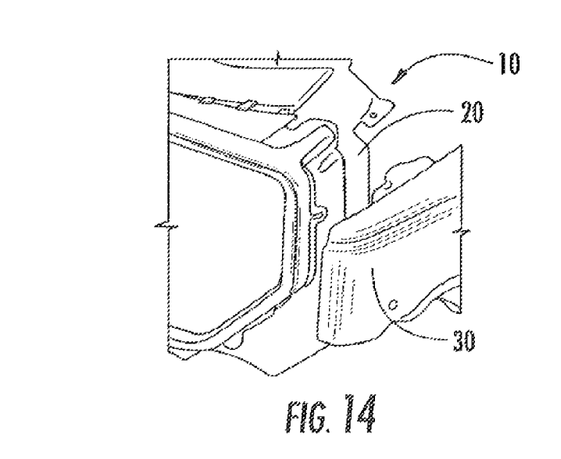
FIG. 14 is a side perspective view of the FEM assembly with the carrier rail engaged with the fender while sliding in position.

Referring to FIGS. 12, 13, and 14, perspective views illustrate an exemplary embodiment of the FEM assembly 10 sliding into the lab 34 in the fender reinforcement bracket 32. FIG. 12 illustrates the FEM assembly 10 with the carrier rail 20 on the FEM carrier 16 sliding onto the tab 34 located on the fender reinforcement bracket 32 on the fender 30. FIG. 13 illustrates a top view of the FEM assembly 10 sliding in position. FIG. 14 illustrates a side view of the FEM assembly 10 with the carrier rail 20 engaged with the fender 30 while sliding in position. As shown in FIGS. 13 and 14, neither the fender 30 nor the grille 14 on the FEM assembly 10 touch during assembly. This allows the FEM assembly 10 to be assembled on a vehicle without complicated lift and positioning equipment which is used to carefully guide the FEM assembly 10 to avoid contact. The FEM assembly 10 provides reduced cost through preventing damage to tenders 30, grilles 14, and the like by reducing repair time due to assembly accidents and future warranty costs on possible corrosion in the fenders due to damage from assembly.

Figure 15:
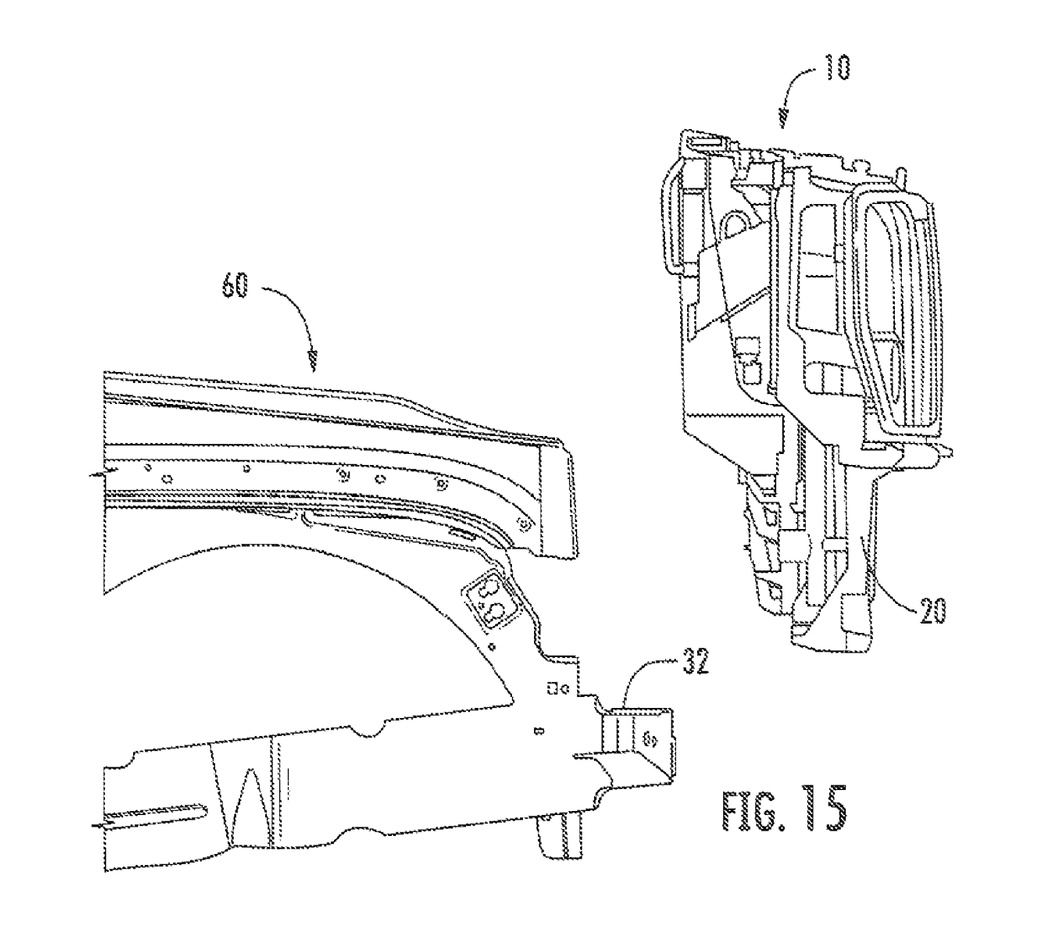
FIG. 15 is a perspective view of the FEM assembly being assembly onto a vehicle.

Referring to FIGS. 15 through 18, the FEM assembly 10 is illustrated during various stages of assembly onto a vehicle frame 60 according to an exemplary embodiment of the present disclosure. FIG. 15 illustrates the FEM assembly 10 with the carrier rail 20 in a first position during the assembly process. The vehicle frame 60 includes the fender reinforcement bracket 32 with a tab configured to engage the carrier rail 20. In this first position, the FEM assembly 10 is positioned upright and moved towards the vehicle frame 60.

Figure 16:
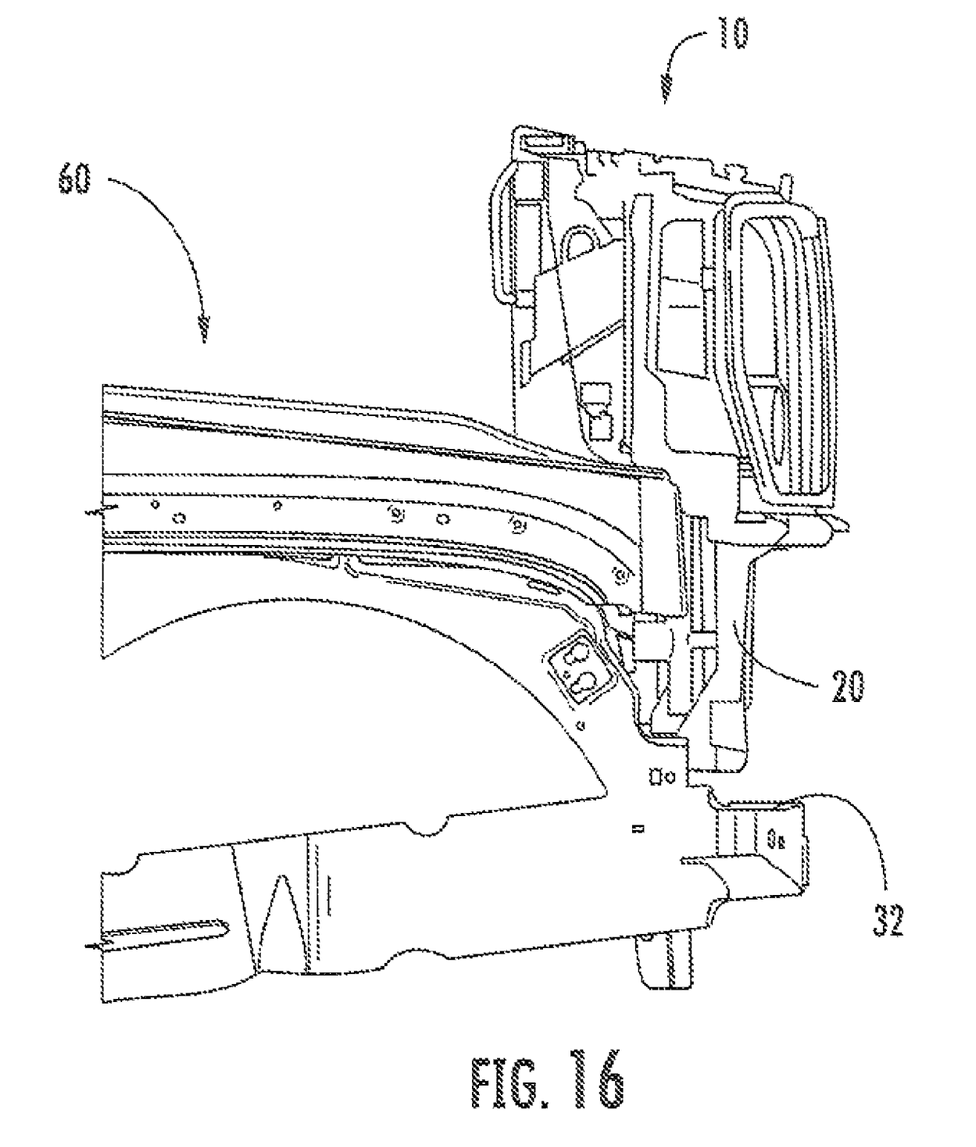
FIG. 16 is another perspective view of the FEM assembly being assembly onto a vehicle.
Figure 17:
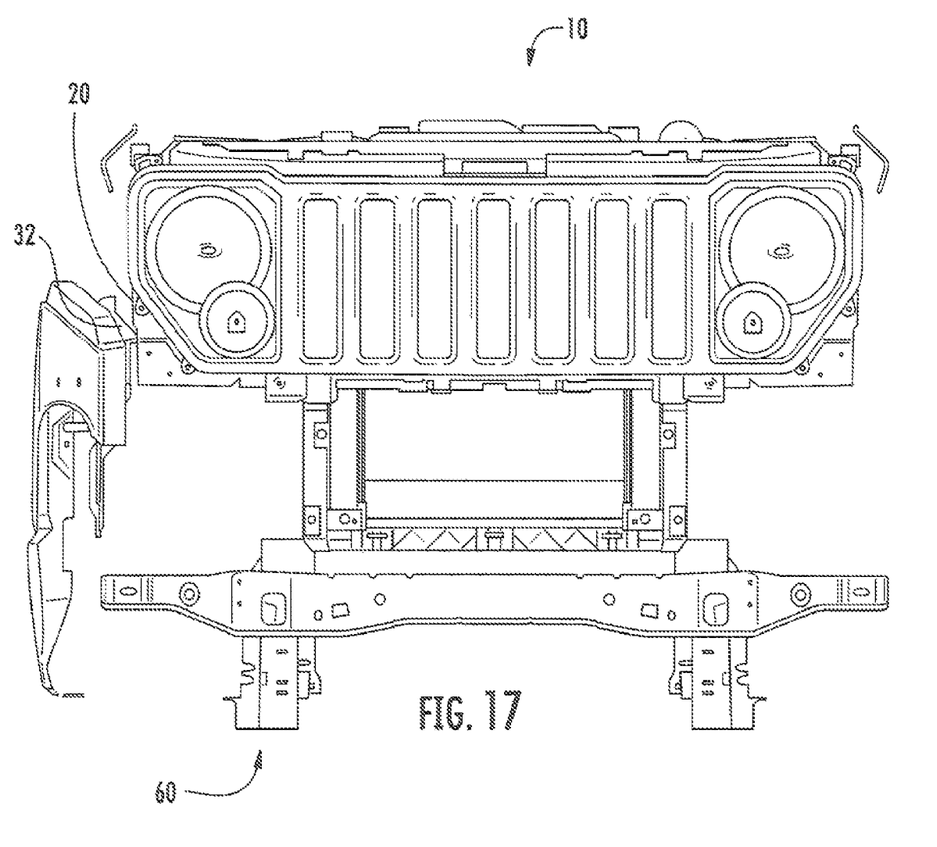
FIG. 17 is yet another perspective view of the FEM assembly being assembly onto a vehicle.

FIG. 16 illustrates the FEM assembly 10 with the carrier rail 20 in a second position during the assembly process. The FEM assembly 10 is positioned adjacent to the vehicle frame 60 with the carrier rail 20 positioned substantially vertical to the tab in the fender reinforcement bracket 32. FIG. 17 illustrates the FEM assembly 10 with the earner rail 20 in a third position during the assembly process. Here, the FEM assembly is positioned similarly as in FIG. 16, i.e., with the carrier rail 20 positioned substantially vertical to the tab 34 in the fender reinforcement bracket 32, and the carrier rail 20 is engaged with the tab located in on the fender reinforcement bracket 32. The tab 34 is configured to engage the carrier rail 20 so that the FEM assembly 10 can be lowered onto the vehicle frame 60. For example, the tab 34 and carrier rail 20 are configured to substantially constrain movement of the FEM assembly 10, such as along a vertical axis with respect to the vehicle frame 60. This allows the FEM assembly 10 to be placed onto the frame 60 with a tight clearance condition between components on the FEM assembly 10 and the fender 30, i.e., the tab 34 and carrier rail 20 prevent contact between the FEM assembly 10 and the fender 30.

Figure 18:
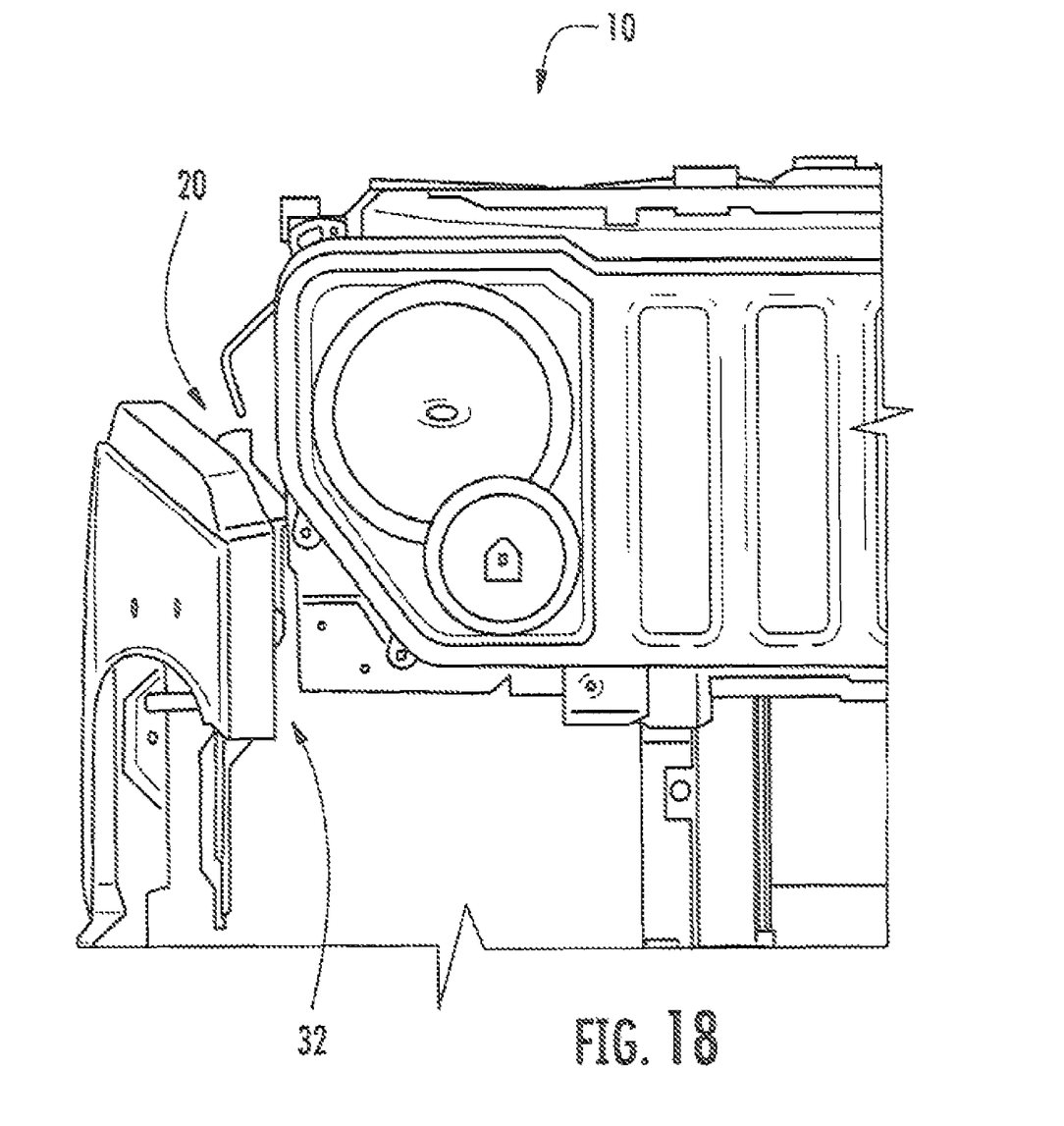
FIG. 18 is yet another perspective view of the FEM assembly being assembly onto a vehicle.

FIG. 18 illustrates the FEM assembly 10 with the carrier rail 20 in a fourth position during the assembly process. Here, the carrier rail 20 is engaged to the tab on the fender reinforcement bracket 32, and the FEM assembly 10 is sliding into position on the vehicle frame 60. Once the FEM assembly 10 is lowered to an installation level along the vertical axis, the carrier rail 20 is disengaged from the tab 34 on the fender reinforcement bracket 32. For example, the FEM assembly 10 can be rotated rearward once lowered to the installation level with the rotation disengaging the carrier rail 20 from the tab 34 on the fender reinforcement bracket 32. Once in this final assembly position, the FEM assembly 10 is attached to the vehicle frame 60, such as through bolts or the like.

As described herein, the present disclosure provides a FEM assembly and associated assembly method with a rail system to enable efficient assembly, tighter clearances between the front end module assembly and the vehicle, and time and cost savings. The FEM assembly includes grilles, headlamps, a coolant module, and the like along with a rail system to enable the FEM assembly to be assembled on a vehicle. Advantageously, the FEM assembly can pass between fenders on the vehicle with a very tight clearance condition. The rail system allows the FEM to be assembled efficiently while protecting grilles and headlamps from being damaged by fenders and protecting the fenders from damage from the FEM. The rail system guides the FEM onto the vehicle for assembly avoiding contact with any portion of the fenders in a dynamic condition. The rail system is attached to a fender reinforcement bracket tab, and once the FEM is in the final installation position, the rail can be disengaged from the fender tab, allowing final assembly by rotating the FEM rearward.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method of assembling a front end module assembly onto a vehicle frame, comprising:
    (a) providing a front end module assembly, wherein the front end module assembly comprises a rail disposed on a front end module carrier;
    (b) positioning the front end module assembly substantially over a vehicle frame;
    (c) engaging the rail with a tab disposed on the vehicle frame;
    (d) guiding the front end module assembly into a final assembly position on the vehicle frame, wherein the rail and the tab are configured to substantially constrain movement of the front end module assembly during the guiding step;
    (e) disengaging the rail from the tab upon guiding the front end module assembly into the final assembly position in step (d); and thereafter
    (f) attaching the front end module assembly to the vehicle frame.

2. The method of assembling a front end module assembly of claim 1, wherein the front end module assembly further comprises any of a grille, a headlamp housing, a coolant module, and combinations thereof.

3. The method of assembling a front end module assembly of claim 1, wherein the vehicle frame comprises a fender.

4. The method of assembling a front end module assembly of claim 1, wherein the substantially constrained movement of the front end assembly of the guiding step (d) is in a vertical direction allowing the front end module assembly to pass between fenders on the vehicle with a tight clearance condition.

5. The method of assembling a front end module assembly of claim 1, wherein the rail and the tab are configured to slidably guide the front end module assembly onto the vehicle frame during step (d) avoiding front end module assembly contact with any portion of a fender attached to the vehicle frame.

6. The method of assembling a front end module assembly of claim 2, wherein the substantially constrained movement of the front end assembly of the guiding step protects the grille and headlamp housing from, being damaged by a fender attached to the vehicle frame and protects the fender from being damaged by the front end module assembly.

7. The method of assembling a front end module assembly of claim 3, wherein the fender comprises a fender reinforcement bracket, and wherein the tab is integrally formed and extends outwardly therefrom.

8. A method of assembling a front end module assembly onto a vehicle frame, comprising:
    (a) providing a front end module assembly, wherein the front end module assembly comprises a pair of spaced apart elongate rails;
    (b) positioning the front end module assembly adjacent a vehicle frame;
    (c) engaging each one of the elongate rails with a corresponding portion of the vehicle frame; and
    (d) guiding the front end module assembly toward an assembly position by engagement between each portion of the vehicle frame and corresponding elongate rail with relative movement therebetween occurring along corresponding elongate rail substantially constraining movement of the front end module assembly in a manner that prevents contact anywhere else between the front end module assembly and the vehicle frame; and
    wherein each elongate rail disengages from the corresponding portion of the vehicle frame when the front end module assembly reaches the assembly position.

9. The method of assembling a front end module assembly of claim 8, wherein relative movement during the guiding step (d) is generally along a lengthwise direction of each elongate rail.

10. The method of assembling a front end module assembly of claim 8, wherein each portion of the frame comprises a tab.

11. The method of assembling a front end module assembly of claim 9, wherein during the guiding step (d) engagement between each elongate rail and corresponding portion of the vehicle frame is slidable engagement.

* * * * *